United States Patent
McCallum

(10) Patent No.: US 9,250,878 B1
(45) Date of Patent: Feb. 2, 2016

(54) FUNCTION ATTRIBUTE FOR DYNAMIC STACK ALLOCATION

(71) Applicant: Red Hat, Inc., Raleigh, NC (US)

(72) Inventor: Nathaniel Philip McCallum, Nicholasville, KY (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/551,643

(22) Filed: Nov. 24, 2014

(51) Int. Cl.
*G06F 9/45* (2006.01)

(52) U.S. Cl.
CPC .................................. *G06F 8/4434* (2013.01)

(58) Field of Classification Search
CPC ...................................................... G06F 8/4434
See application file for complete search history.

(56) References Cited

U.S. PATENT DOCUMENTS

| | | | | |
|---|---|---|---|---|
| 5,590,329 | A * | 12/1996 | Goodnow, II | G06F 11/3624 714/E11.211 |
| 5,835,958 | A * | 11/1998 | Long | G06F 9/4425 707/999.202 |
| 7,117,318 | B1 | 10/2006 | Tene et al. | |
| 7,168,071 | B2 | 1/2007 | Wu et al. | |
| 7,272,748 | B1 * | 9/2007 | Conover | G06F 11/1407 712/233 |
| 7,512,738 | B2 | 3/2009 | Balakrishnan et al. | |
| 7,685,601 | B2 | 3/2010 | Iwamoto | |
| 7,784,057 | B2 | 8/2010 | Davis et al. | |
| 8,341,614 | B2 | 12/2012 | Garst, Jr. et al. | |
| 8,601,456 | B2 | 12/2013 | Duffy et al. | |
| 2003/0191976 | A1 * | 10/2003 | Cyran | G06F 11/3017 713/340 |
| 2013/0086598 | A1 * | 4/2013 | Gschwind | G06F 9/3859 719/330 |
| 2014/0095812 | A1 * | 4/2014 | McLachan | G06F 12/023 2/23 |

OTHER PUBLICATIONS

Jang, Sung-Joon, et al. "Cache Miss-Aware Dynamic Stack Allocation", Dept. of EECS, KAIST, Daejeon, Korea, 2007, pp. 3494-3497 http://ssal.kaist.ac.kr/~kyung/Paper/International Conference/IC-154.pdf.

"Symbol Tables for PA4, Method Calls", Colorado State University, Mar. 27, 2013, pp. 1-8 http://www.cs.colostate.edu/~cs453/yr2014/Slides/17-symbol-tables-for-methods.txt.

* cited by examiner

*Primary Examiner* — Philip Wang
(74) *Attorney, Agent, or Firm* — Lowenstein Sandler LLP

(57) ABSTRACT

A method includes receiving, by a processing device executing a compiler, source code of a function associated with a compiler prompt, in which the function includes at least one variable to be allocated in a memory space on a stack, determining that the compiler prompt indicates to retain at least a portion of the allocated memory space on the stack after execution of the function, and compiling, in view of the compiler prompt, the source code to generate a prologue function and an epilogue function associated with execution of the function, in which the prologue function is to allocate the memory space for the function, and at least one of the prologue function or the epilogue function is to cause to retain the at least a portion of the allocated memory space on the stack after the execution of the function.

20 Claims, 6 Drawing Sheets

FUNCTION ATTRIBUTE FOR DYNAMIC STACK ALLOCATION

TECHNICAL FIELD

This disclosure relates to allocating memory space and, and in particular, to dynamically allocating memory space on a stack using function attributes.

BACKGROUND

Programming languages provide functions to allocate memory space for a variable. The size of the allocated memory may be determined statically during compilation of the program code, or dynamically during execution of the code. The variable may belong to a certain type that is available in the programming language. For example, the variable may be a structure type in C programming language that may further include members within the structure. The memory space of the variable may be allocated on a heap or a stack. A heap is a tree-type data structure that satisfies the heap property. A stack is a linear list in which all additions and deletions are restricted to one end of the list (such as the top of the list). The structure that is allocated on a stack may have the advantages of being thread-safe and having automatic resource clean-up determined by a function scope. The clean-up may include destantiation of the structure.

However, the trade-off for allocating memory space on the stack is that the members of a structure variable may need to be made public. Although certain programming languages (such as C++) may provide keyword access to these members so that the access to these members is limited to keyword holders, any change to this size (which needs to be made public), breaks the encapsulation provided by an Application Binary Interface (ABI). The ABI is the interface between two program modules at the machine code level.

One exemplary implementation of allocating the structure on a stack is the alloca( ) function in certain installations of software environments. While alloca( ) may circumvent some of the problems associated with allocating memory on a stack, implementations of alloca( ) do not guarantee dynamic stack-based memory allocation because, although alloca( ) appears to be a function, it is sometimes handled by the compiler in certain implementations. This may cause stack overflows and difficulties in debugging. Further, the use of alloca( ) allocations is limited to a single scope context.

BRIEF DESCRIPTION OF THE DRAWINGS

The present disclosure is illustrated by way of example, and not by way of limitation, in the figures of the accompanying drawings.

DETAILED DESCRIPTION

Figure 1:
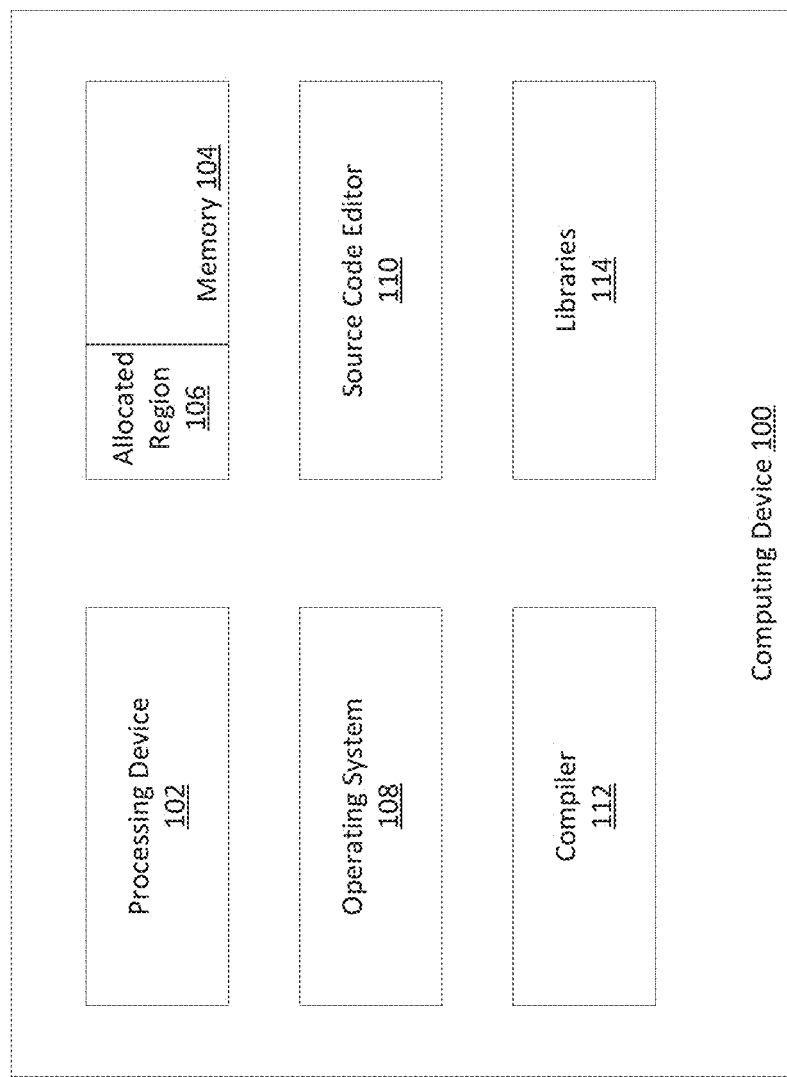
FIG. 1 illustrates an exemplary computing device according to an implementation of the present disclosure.

Implementations of the present disclosure may relate to a method including receiving, by a processing device executing a compiler, source code of a function associated with a compiler prompt, in which the function includes at least one variable to be allocated in a memory space on a stack, determining that the compiler prompt indicates to retain at least a portion of the allocated memory space on the stack after execution of the function, and compiling, in view of the compiler prompt, the source code to generate a prologue function and an epilogue function associated with the execution of the function, in which the prologue function is to allocate the memory space for the function, and at least one of the prologue function or the epilogue function is to cause to retain the at least a portion of the allocated memory space on the stack after the execution of the function.

Implementations of the present disclosure may include a system including a memory and a processing device, communicatively coupled to the memory, executing a compiler to receive source code of a function associated with a compiler prompt, in which the function includes at least one variable to be allocated in a memory space on a stack, determine that the compiler prompt indicates to retain at least a portion of the allocated memory space on the stack after execution of the function, and compile the source code to generate a prologue function and an epilogue function associated with the execution of the function, in which the prologue function is to allocate the memory space for the function, and at least one of the prologue function or the epilogue function is to cause to retain the at least a portion of the allocated memory space on the stack after the execution of the function.

Implementations of the present disclosure may include a method to allocate memory space on a stack for variables within the scope of a function using compiler prompts associated with the function. A compiler prompt may be a designated string of characters embedded in the source code that the compiler may identify to be associated with certain compilation rules. In some implementation, a compiler prompt may be a function attribute or a keyword in a programming language.

In one implementation, a function attribute of a function in a programming language (such as C/C++) is a special marker in the source code of the function that may attach certain characteristics to the function declaration and prompt a compiler to perform (or refrain from performing) certain acts during execution of the function. For example, in the C programming language, a function attribute may be specified with "_attribute_" following the function declaration or a variable of the function. Specific function attributes may be specified in parentheses after the attribute marker. In one implementation, the method of the present disclosure may include receiving source code including a function declaration marked with a function attribute indicating to a compiler that the allocation and deallocation of memory space on a stack for the function may follow certain customized rules rather than the default rules when the function is not associated with any function attribute. In one implementation, the function attribute may indicate to the compiler that, after the function is called, local variables within the scope of the function cannot be referenced via an offset from the stack pointer.

FIG. 1 illustrates a computing device 100 according to an implementation of the present disclosure. As shown in FIG. 1, the computing device 100 may include a processing device 102 communicatively coupled to a memory 104. The processing device 102 may be a hardware processor (or processing core) or central processing unit (CPU) of the computing device 100. The memory 104 may provide storage space for applications executed by the processing device 102. Additionally, computing device 100 may include other hardware resources such as network interfaces, hard drives, and input/output (I/O) devices.

In one implementation, the hardware resources of the computing device 100 may operate within a computing environment which may include software resources of system applications and user applications. The system applications may include an operating system 108 that may manage operations of hardware resources and provide common services to software applications. For example, the operating system 108 may schedule the execution of system applications and user applications on the processing device 102.

In addition to the operating system 108, the computing environment may include user applications installed on the computing device 100. In one implementation, the user applications may include a software development environment for programmers to develop applications on the computing device 100. The software development environment may include a source code editor 110, a compiler 112, and libraries 114. The source code editor 110 is a program editor that may provide a user interface to allow programmers to write source code of an application in a particular programming language. For example, programmers may use the source code editor 110 to write a printer application in a programming language (such as C or C++) that is understandable by human programmers.

During the development of the source code, programmers may write the source code to include calls to certain routines that have been previously created and stored in the libraries 114. These routines may be functions that may be reused by different applications. A function may be a module or block of program code dealing with a particular task. Functions may isolate one block of code from other independent blocks of code. A function may be called by a caller function. The caller function may pass certain parameters to the function. After execution, the function may return to the caller function so that the caller function may continue. The functions may have been precompiled in machine-executable binary form. The compiler 112 is a program that may transform the source code written in high-level programming languages (such as C, C++) into low-level programming languages (such assembly code) that may be translated (e.g., by an assembler) into machine code executable by the processing device 102.

In one implementation, the source code may include declaration of a pointer to a segment of memory 104 in which the values of a certain type of variable may be stored. Prior to assigning values to the variable, a region of memory 104 may need to be allocated for the pointer to prevent other programs from writing into the same memory location—an error that may lead to unexpected results. The memory may be logically divided into frames. Each application (or thread of an application) may work with a dedicated frame of memory. An allocated region of memory 106 may be within the frame of the memory 104 that is dedicated to the application. In one implementation, the frame of memory dedicated to an application may be organized as a stack. The stack may be a fixed sized stack (e.g., 8 megabyte), or a variable sized stack (e.g., varying according to the need of the program), or a link list implemented on a heap.

In an implementation, a structure including one or more members may be defined in source code of a function. A variable may be declared to be the type of the structure. The structure variable may be allocated on a heap or on a stack such that the content of the structure variable is organized as a heap or a stack. There are certain advantages to allocating a structure variable on the stack over allocating the structure variable on the heap. However, current approaches to allocating memory on the stack (such as alloca( )) may still expose the size of the allocated memory region. For example, the function alloca( ) takes as a parameter the size of the memory to be allocated. Hence, in order to use the function alloca( ), the size of the memory to be allocated should have been known at the point of allocation in the source code.

To address these issues, implementations of the present disclosure use certain compiler prompts (such as function attributes or keywords) associated with a function to inform the compiler and the caller of the function that calling this function causes modification to the behavior of memory allocation. The modification may include the retention of the allocated memory after the execution of the function and/or retaining a stack pointer value after the execution rather than restoring the stack pointer to its original value. This may prompt the compiler not to use the stack pointer as an offset reference after the function is called from a caller function, since the stack pointer has been moved and using the stack pointer as a reference to access a local variable may cause unexpected results.

In one implementation, one or more function attributes may be defined to inform the compiler to use a modified version of prologue and/or epilogue functions to prepare the stack pointer for the function, and to provide hints to the caller function that the value of the stack pointer is changed. In one implementation, a first function attribute (e.g., named as "retain stack") may be defined and associated with a function. The function attribute of "retain stack" may inform the compiler that the stack pointer should be prepared by a version of prologue function and/or epilogue function that retain the value of the stack pointer after completing the scope of the function rather than restoring to its original value. In one implementation, a second function attribute (e.g., named as "invalidates_stack") may be defined and associated with the function to provide a hint to a caller function of the function that the value of the stack point is changed by calling the function.

FIGS. 2A-2D illustrate exemplary stack allocations according some implementations of the present disclosure.

Figure 2A:
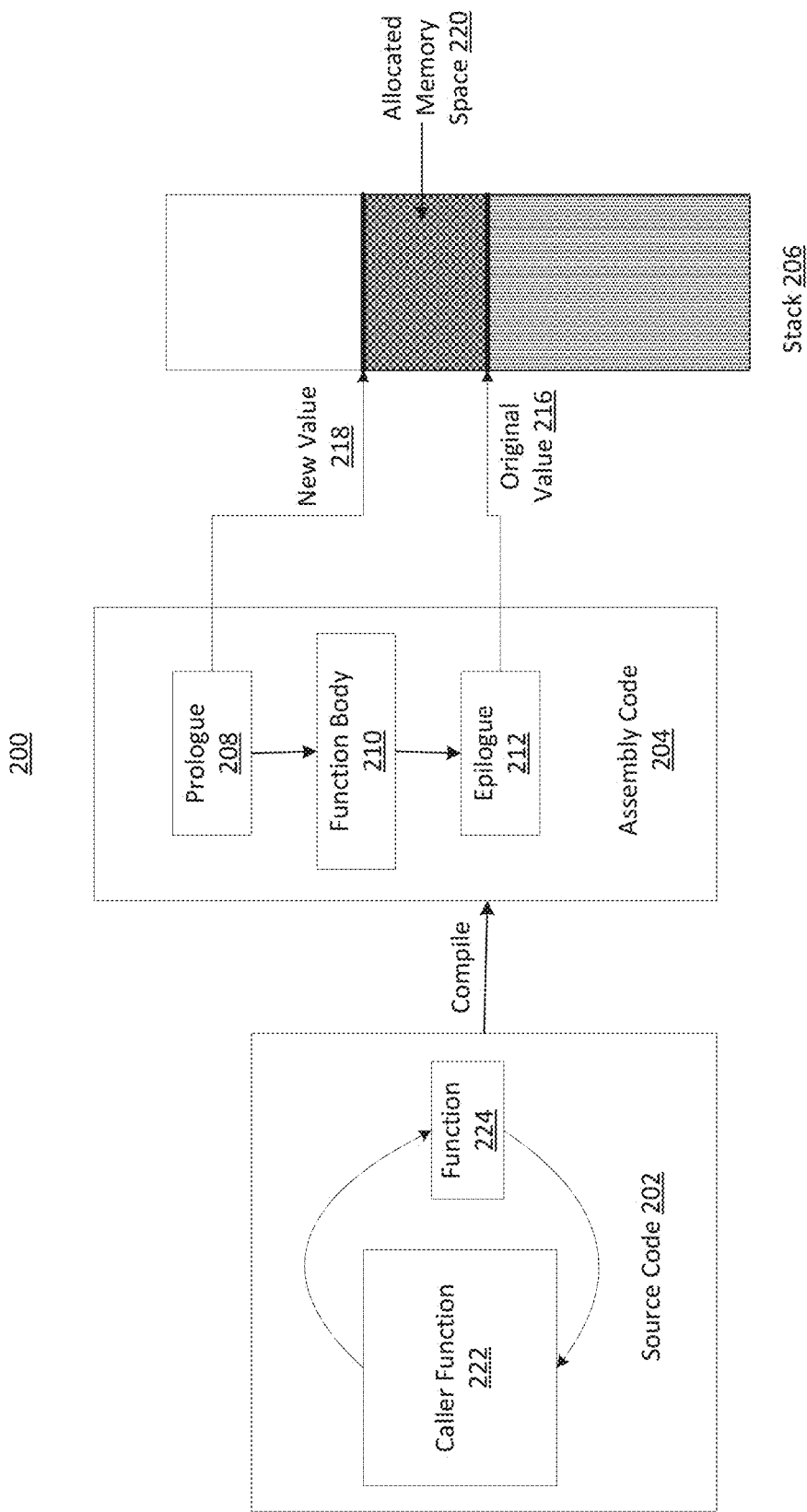
FIGS. 2A-2D illustrate exemplary stack allocations according some implementations of the present disclosure.

FIG. 2A illustrates an exemplary process to allocate memory on a stack for a function according to an implementation of the present disclosure. Referring to FIG. 2A, source code 202 may be developed using the source code editor 110 and stored in a data store. The source code 202 may include code of a caller function 222 (or a parent function) and a function 224 (or child function) called by the caller function within the scope of the caller function 222. The caller function may call the function 224 to perform certain tasks. After completing the execution of the function 222 either by finishing the tasks or in response to certain events such as execution errors, the execution may be returned to the caller function 222. In one implementation, the caller function 222 may be called by another caller function (not shown) to form a function calling chain.

The processing device 102 may execute the compiler 112 to compile the source code 202 into assembly code 204. The assembly code 204 may be converted into machine code (such as object code) by an assembler (not shown). With respect to the function 224, the compiler may compile the source code of the function 224 into function body assembly code 210 that performs the tasks encoded in the function source code 224. In addition to the function body assembly code 210, the compiler may also generate a prologue function 208 and/or an epilogue function to prepare the memory space needed by the function body assembly code 210 on a stack 206. The stack 206 may have been assigned by a kernel of the operating system to a program including the caller function 222 and the function 224. A prologue function may include one or more lines of assembly code placed at the beginning of the assembly code 204 to allocate memory space used by the function on the stack 206. For example, referring to FIG. 2A, the stack pointer for the stack 206 may be at the original value 216 before calling the function assembly code 204. In response to calling the function assembly code 204, the prologue function 208 may move the stack pointer to a new value 218 to make an allocated stack space 220 which may be used to execute the function body assembly code 210. In certain implementations, the original value 216 of the stack pointer may be saved in a base pointer register (not shown) to prepare for a later restoration of the stack to its state prior to executing the assembly code 204 of the function.

After execution of the function body assembly code 210, the epilogue function 212 may prepare the stack 206 for further execution of the caller function. An epilogue function may include one or more lines of assembly code placed at the end of the function to reverse certain operations of the prologue function. For example, in some situations, the epilogue 212 may retrieve the original value 216 from the base pointer register and assign the original value 216 to the stack pointer. In this way, the epilogue 212 may restore the stack pointer back to its original position after execution of the function assembly code 210.

Implementations of the present disclosure may include a compiler that generates prologue a function 208 and/or an epilogue function 212 that may retain the allocated stack space 220 or a portion of the allocated stack space 220 after execution of the assembly code 204. In some implementations, one or more function attributes may be defined and associated with the function 224 in the source code to inform the compiler and the caller function 222 of the modification to the stack after the calling of the function 224.

In one implementation, the one or more function attributes may inform the compiler and the caller function 222 that the allocated stack space 220 is fully retained after the execution of the epilogue function 212 of the function body assembly code 210. For example, an exemplary full expand function code in C programming language is shown in Table 1.

TABLE 1 void expand (void) _ attribute_ ((retain_stack, invalidates_stack))
{
  char x;
  long y;
  /* miscellaneous code */
}

Figure 2C:
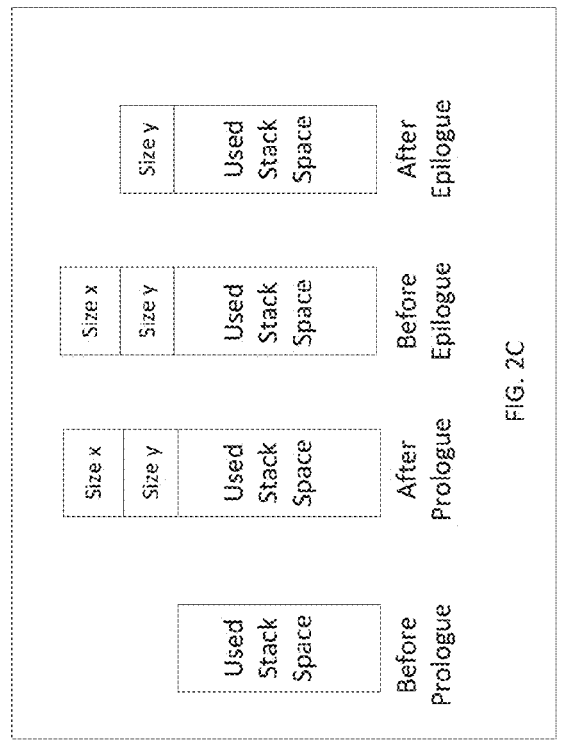
Figure 2B:
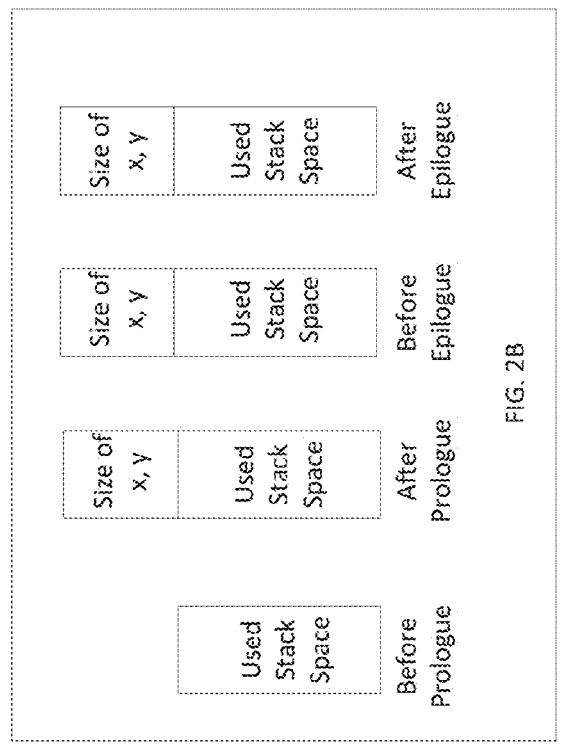

As shown in Table 1, the function attributes "retain_stack" and "invalidates_stack" may be associated with the function expand( ). The function attribute "retain_stack" may inform the compiler to generate a prologue function 208 and/or an epilogue function 212 that may retain the expanded stack after the execution of expand( ) and the return to the caller function 222, and the function attribute "invalidates_stack" may provide a hint to a caller function 222 that the value of the stack pointer is going to be changed after calling expand( ). FIG. 2B illustrates the process of expanding the stack by the prologue function 208 and the epilogue function 212 during execution. After calling the prologue function, the used (or previously allocated) stack may be expanded by the size of variables x and y. After executing expand( ) and the epilogue function 212, the allocated stack is retained.

The expansion and retain of the stack space of the function 222 may be achieved by any suitable implementations of the prologue function 208 and/or the epilogue function 212. In one implementation, the prologue function 208 may include assembly code that performs operations of making room on the stack for variables x and y, saving the base pointer, and setting the base pointer to the stack position. Since the base pointer is saved after making room for the variables x and y, the restoration by the epilogue 212 does not move the stack pointer to its original value. In another implementation, the prologue function may allocate memory on the stack for the function prior to saving the base pointer, and then making room on the stack for variables x and y. However, the compiler may generate an epilogue that do not deallocate the allocated memory space for the variables x and y after the execution of the function. In yet another implementation, the compiler may generate a prologue function that push the size of variables x and y in a location on the stack 206, and an epilogue function that pop the size of variables x and y from the location so that the epilogue function may retain the memory space allocated for the variables x and y.

In one implementation, the one or more function attributes may inform the compiler and the caller function 222 that the allocated stack space 220 is partially retained after the execution of the epilogue function 212 of the function assembly code 210. For example, an exemplary full expand function code in C programming language is shown in Table 2.

TABLE 2 void partially_expand (void) _ attribute_ ((invalidates_stack))
{
  char x;
  long y _ attribute_((retain_stack));
  /* miscellaneous code */
}

As shown in Table 2, the function attributes "invalidates_stack" may be associated with the function partially_expand( ) and the function attribute "retain_stack" may be associated with the variable y. The function attribute "retain_stack" may inform the compiler to generate a prologue function 208 and/or an epilogue function 212 that may retain the expanded stack for the variable y, and the function attribute "invalidates_stack" may provide a hint to a caller function 222 that the value of the stack pointer is going to be changed after calling partially_expand( ). FIG. 2C illustrates the process of expanding the stack by the prologue function 208 and the epilogue function 212 during execution. After calling the prologue function, the used stack may be expanded by the size of variables x and y. After executing partially_expand( ) and the epilogue function 212, the allocated stack space for the variable y is retained while the memory space for variable x is released.

The expansion and partial retain of the stack space of the function 222 may be achieved by any suitable implementations of the prologue function 208 and/or the epilogue function 212. In one implementation, the prologue function 208 may include assembly code that performs operations of making room in the stack for variable y, saving the base pointer, setting the base pointer to the stack position, and making room for variable x. Since the base pointer is saved after making room for the variable y and prior to making room for variable x, the restoration by the epilogue 212 can only restore the portion for the variable x and leave the expanded stack for y retained.

In one implementation, the full and partial retain of the allocated stack space may be used to implement a new alloca( ) function (herein referred to as a "my_alloca( )"). In one implementation, a Variable Length Array (VLA) may be used to allocate a stack space according to a size for the VLA passed through as a parameter of my_alloca( ). Using the method described above, after calling my_alloca( ), the compiler may know that attempting to reference local variables as offsets from the stack pointer are not correct because the stack pointer was not restored.

Table 3 shows an exemplary caller function and exemplary my_alloca( ).

TABLE 3

```
void *my_alloca (size_t size) _ attribute_
((retain_stack, invalidates_stack))
{
   char tmp[size];
   return tmp;
}
void local_variable_reference (void)
{
   char x,
   void *y;
   /* compiled code that executed here can reference x as an
   offset from the stackpointer*/
   y = my_alloca(16);
   /* compiled code that executes here cannot reference x
   as an offset from the stackpointer*/
}
```

As shown in Table 3, the implemented function my_alloca( ) allocates a memory space of size in the stack and return a reference pointer of tmp to the caller function. Because of the function attribute "retain_stack," after calling my_alloca( ), the expanded stack is retained rather than restored. Hence, within the scope of the caller function local_variable_reference( ), compiled code before calling my_alloca( ) may reference local variable x as an offset from the stack pointer, but not after calling my_alloca( ) because the stack pointer has changed. Attempt to reference local variables as offsets from the stack pointer is a compiler technique. In one implementation, because of the function attributes of "retain_stack" and "invalidates_stack," the compiler may know not to reference local variables as offsets from the stack pointer after calling my_alloca( ).

In some implementations, function attributes (such as "retain_stack" and "invalidates_stack") may permit chaining of allocations in multiple layers of function calls, passing scope of each allocation in the chain to the calling function. In one implementation, the prologue function 208 and the epilogue function 212 may be modified to allow the chaining to occur. Table 4 illustrates an exemplary source code including chaining of function attributes.

TABLE 4

```
struct ip_address *
ip_address_new_stack (const char *ip)
   _attribute_ ((invalidates_stack));
struct connection {
     struct ip_address *src;
     struct ip_address *dst;
}
struct connection *
connection_new_stack (const char *src, const char *dst)
   _attribute_((retain_stack, invalidates_stack))
{
   struct connection conn = {
     ip_address_new_stack (src),
     ip_address_new_stack (dst)
   };
   Return &conn;
}
```

Referring to Table 4, function connection_new_stack (const char *src, const char *dst) associated with function attributes of "retain_stack" and "invalidates_stack" may construct a complex data type that may further construct two new struct ip_address objects therein. In one implementation, the function attribute "retain_stack" may support chaining. Because of the chaining, the two new struct ip_address objects created in the constructor may have the same scope as the struct connection itself.

Figure 2D:
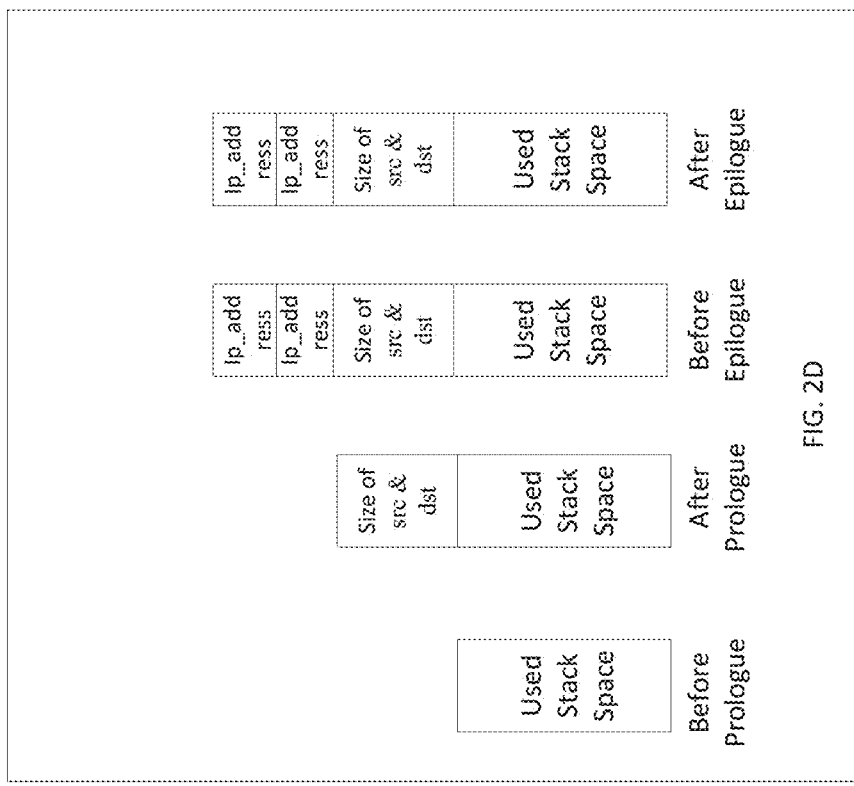

FIG. 2D illustrates the expansion of the stack during the execution of the chaining code as shown in Table 3. After executing the prologue function, the used stack may be expanded by the size of variable src and dst. During the execution before the epilogue function, the stack may be further expanded by the two new struct ip_address objects because of the chaining. After the epilogue function, the expanded stack through the chaining is retained in the caller function.

Figure 3:
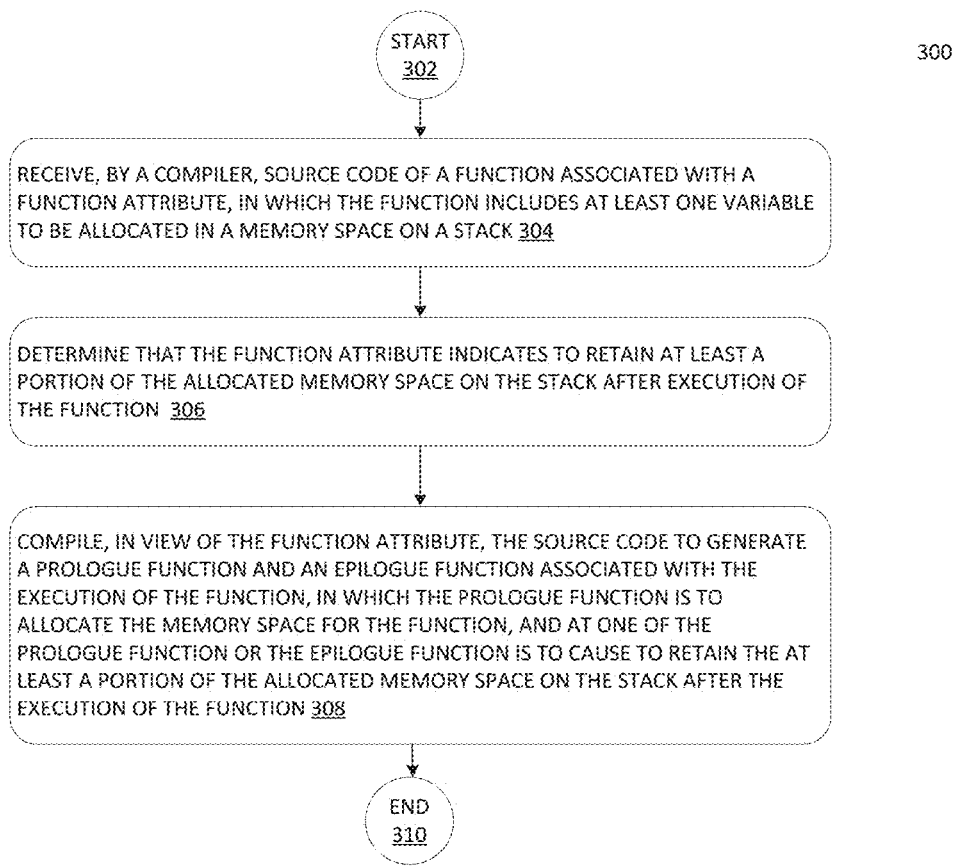
FIG. 3 is a flow diagram illustrating an exemplary method to dynamically allocate stack according to an implementation of the present disclosure.

FIG. 3 is a flow diagram illustrating a method 300 to use function attributes to allocate memory on a stack according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the compiler 112 executed on the processing device 102 as shown in FIG. 1.

Referring to FIG. 3, at 302, the processing logic may start compilation of source code at 302.

At 304, the compiler may receive source code from a software development environment. The source code may include a function that is marked with a function attribute. The function may include one or more variables that need memory allocation on a stack.

At 306, the compiler may determine that the function attribute (e.g., "retain_stack") indicates to the compiler to retain the allocated memory or a portion of the allocated memory for the function on the stack.

To achieve this, at 308, the compiler may compile the source code to generate a prologue function and an epilogue function that are associated with the execution of the function. The generated prologue function may allocate the memory space for the function on the stack. Further, the generated prologue function or the generated epilogue function may cause to retain the allocated memory or a portion of the allocated memory for the function on the stack after the execution of the function.

Figure 4:
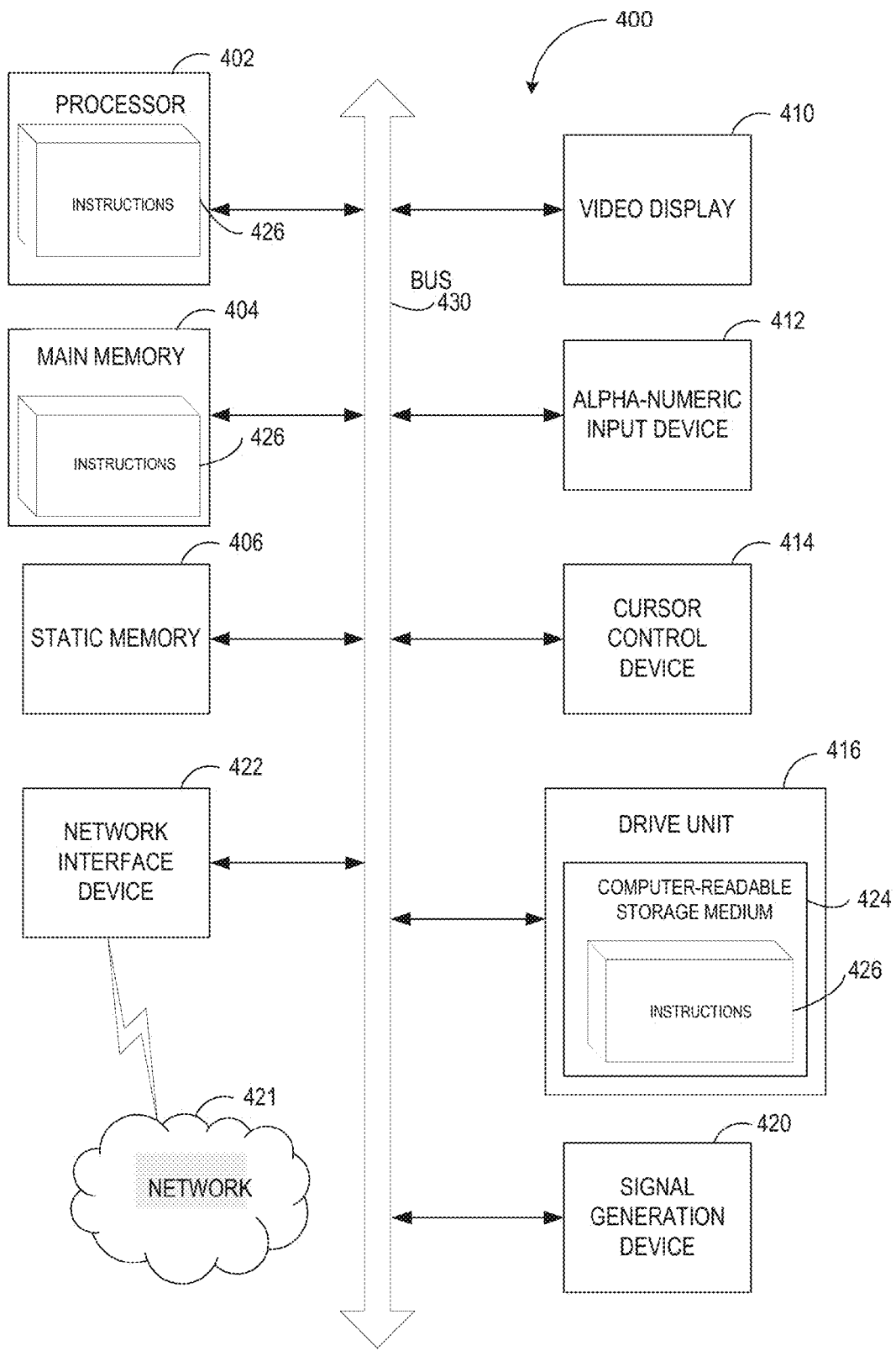
FIG. 4 is a block diagram illustrating an exemplary computer system, according to some implementations of the present disclosure.

FIG. 4 illustrates a diagrammatic representation of a machine in the exemplary form of a computer system 400 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., processing device 102). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 422.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device executing a compiler, source code of a function associated with a first compiler prompt, wherein the function comprises at least one variable to be allocated in a memory space on a stack;
   determining, by the compiler, that the first compiler prompt indicates to retain at least a portion of the allocated memory space on the stack after execution of the function; and
   compiling, by the compiler in view of the first compiler prompt, the source code to generate a prologue function and an epilogue function associated with the execution of the function, wherein the prologue function is to allocate the memory space for the function, and wherein at least one of the prologue function or the epilogue function is to cause to retain the at least a portion of the allocated memory space on the stack after the execution of the function.

2. The method of claim 1, further comprising:
   converting, by the processing device, the source code of the function into machine code; and
   executing the machine code.

3. The method of claim 1, wherein the prologue function comprises one or more lines of assembly code executed prior to the execution of the function, and wherein the epilogue function comprises one or more lines of assembly code executed after the execution of the function.

4. The method of claim 1, wherein the prologue function is to:
   subsequent to allocating the memory space, save a base pointer of the stack in a register, wherein the base pointer points to a region of the stack comprising the allocated memory space.

5. The method of claim 4, wherein the epilogue function is to retrieve the base pointer stored in the register after the execution of the function.

6. The method of claim 1, wherein the prologue function is further to:
   allocating, in view of the first compiler prompt, a first portion of the memory space of the function on the stack;
   subsequent to allocating the first portion of the memory space, saving a first base pointer of the stack in the register, wherein the first base pointer points to a first region of the stack comprising the first portion of the allocated memory space; and
   allocating a second portion of the memory space on the stack for the function.

7. The method of claim 6, wherein the epilogue function is to retrieve the first base pointer stored in the register after the execution of the function.

8. The method of claim 6, wherein the first compiler prompt is associated with a first variable of the function, and wherein the first portion of the memory space is allocated for the first variable on the stack.

9. The method of claim 1, wherein the epilogue function generated by the compiler does not perform memory deallocation for the at least a portion of the allocated memory space after the execution of the function.

10. The method of claim 1, wherein the prologue function is to push a size of the at least a portion of the allocated memory space at a location on the stack, and wherein the epilogue function is to pop the size of the at least a portion of the allocated memory space from the location on the stack and to retain the portion of the allocated memory space on the stack in accordance with the size of the at least a portion of the allocated memory space.

11. The method of claim 1, wherein the source code of the function is marked with a second compiler prompt indicating to a caller function of the function that a stack pointer to the stack is invalid after calling the function, and wherein the first and second compiler prompts are function attributes associated with the function.

12. The method of claim 1, wherein the function is called by a caller function, and wherein the at least a portion of the allocated memory space is retained after the execution of the function returns to the caller function.

13. A non-transitory machine-readable storage medium storing instructions which, when executed, cause a processing device to perform operations comprising:
   receiving, by the processing device executing a compiler, source code of a function associated with a first compiler prompt, wherein the function comprises at least one variable to be allocated in a memory space on a stack;
   determining, by the compiler, that the first compiler prompt indicates to retain at least a portion of the allocated memory space on the stack after execution of the function; and
   compiling, by the compiler in view of the first compiler prompt, the source code to generate a prologue function and an epilogue function associated with the execution of the function, wherein the prologue function is to allocate the memory space for the function, and wherein at least one of the prologue function or the epilogue function is to cause to retain the at least a portion of the allocated memory space after the execution of the function.

14. The machine-readable storage medium of claim 13, wherein the prologue function comprises one or more lines of assembly code executed prior to the execution of the function, and wherein the epilogue function comprises one or more lines of assembly code executed after the execution of the function.

15. The machine-readable storage medium of claim 13, wherein the epilogue function generated by the compiler does not perform memory deallocation for the at least a portion of the allocated memory space after the execution of the function.

16. The machine-readable storage medium of claim 13, wherein the source code of the function is marked with a second compiler prompt indicating to a caller function of the function that a stack pointer to the stack is invalid after calling the function, and wherein the first and second compiler prompts are function attributes associated with the function.

17. The machine-readable storage medium of claim 13, wherein the function is called by a caller function, and wherein the at least a portion of the allocated memory space is retained after the execution of the function returns to the caller function.

18. A system, comprising:
   a memory; and
   a processing device, communicatively coupled to the memory, executing a compiler to:
      receive source code of a function associated with a first compiler prompt, wherein the function comprises at least one variable to be allocated in a memory space on a stack,
      determine that the first compiler prompt indicates to retain at least a portion of the allocated memory space on the stack after execution of the function, and
      compile the source code to generate a prologue function and an epilogue function associated with the execution of the function, wherein the prologue function is to allocate the memory space for the function, and wherein at least one of the prologue function or the epilogue function is to cause to retain the at least a portion of the allocated memory space on the stack after the execution of the function.

19. The system of claim 18, wherein the prologue function comprises one or more lines of assembly code executed prior to the execution of the function, and wherein the epilogue function comprises one or more lines of assembly code executed after the execution of the function.

20. The system of claim 18, wherein the source code of the function is marked with a second compiler prompt indicating to a caller function of the function that a stack pointer to the stack is invalid after calling the function, and wherein the first and second compiler prompts are function attributes associated with the function.

* * * * *